United States Patent

Daynard

[15] 3,651,799
[45] Mar. 28, 1972

[54] SYSTEM FOR MUTUALLY EXCLUSIVE MONITORING OF NATURAL HEARTBEAT AND PACER-STIMULATED HEARTBEAT

[72] Inventor: Richard F. Daynard, Chelmsford, Mass.
[73] Assignee: American Optical Corporation, Southbridge, Mass.
[22] Filed: May 11, 1970
[21] Appl. No.: 36,232

[52] U.S. Cl. .................................128/2.06 R, 128/419 P
[51] Int. Cl. .............................................................A61b 5/04
[58] Field of Search .................128/2.06 A, 2.06 F, 2.06 R, 128/419 P, 421, 422

[56] References Cited

UNITED STATES PATENTS

| | | | |
|---|---|---|---|
| 3,135,264 | 6/1964 | Tischler et al. | 128/419 P |
| 3,195,540 | 7/1905 | Waller | 128/419 P |
| 3,426,748 | 2/1969 | Bowers | 128/419 P |
| 3,523,539 | 8/1970 | Lavezzo | 128/419 P |

Primary Examiner—William E. Kamm
Attorney—William C. Nealon, Noble S. Williams and Robert J. Bird

[57] ABSTRACT

A pacer and R-wave monitor system. The system includes a heartbeat detector and circuitry that distinguishes natural heartbeats from pacer-stimulated heartbeats. The system also provides an indication of which type of heartbeat occurs. Meters can be used as the indicators or monitors.

10 Claims, 3 Drawing Figures

INVENTOR.
RICHARD F. DAYNARD
BY
ATTORNEY

INVENTOR.
RICHARD F. DAYNARD
BY
William C. ...
ATTORNEY

SYSTEM FOR MUTUALLY EXCLUSIVE MONITORING OF NATURAL HEARTBEAT AND PACER-STIMULATED HEARTBEAT

BACKGROUND

In the rapidly growing medical-electronics field, there is a continual need for more sophisticated vital-sign monitoring systems. My invention relates to monitoring apparatus. More particularly, it relates to apparatus for monitoring output from a pacer, and for monitoring output from the natural beating action of a person's heart.

In U.S. Pat. No. 3,345,990 to Berkovits, there is disclosed a pacing apparatus which provides electrical heart-stimulating impulses to a patient's heart only in the absence of natural heartbeats. In U.S. Pat. No. 3,528,428 to Berkovits, there is disclosed an improved version of the pacing apparatus of the earlier patent. The disclosures thereof are incorporated herein by reference.

My invention is to be used with pacing apparatus. There are particular advantages in using my invention with a demand pacer of the type described therein. However, my invention can be used in monitoring heartbeats of persons equipped with other types of pacing apparatus.

Heartbeat pacers, of the "demand" type, are normally arranged to generate electrical impulses at predetermined time intervals approximately at the rate of natural heartbeats. Upon detection of a natural heartbeat the next electrical stimulus which would otherwise be generated is inhibited. At the same time, the pacer restarts its timing cycle so that the next electrical impulse will be generated (if needed) after the predetermined time interval has elapsed, starting with the heartbeat just detected. The result is an overall "integrated" operation, i.e., a mutually exclusive cooperation of natural heartbeats and stimulating impulses.

The waveshape of an electrical signal produced by a heartbeat is the well-known PQRST complex. The R-wave is the largest pulse of the complex and is the one used in pacer operation. Accordingly, the R-wave is monitored in my invention.

However, one cannot readily determine if a heartbeat is stimulated or natural. An existing method for making this determination and for interpreting pacer function is to record an EKG signal and analyze its trace. Another method is to observe the waveshape on a cardiac monitor screen.

There are drawbacks and problems associated with these methods. One problem is that the monitoring and EKG trace equipments are not always attached to patients or persons being temporarily paced. For example, when patients are being transported to surgery, the monitoring equipment is not readily available. During this critical time it is important to know if the patient's heartbeat is natural or stimulated, as the condition of the heart influences the doctor's operating procedures.

Another problem is that there is no provision for safely monitoring directly on the catheter. If a temporarily implanted catheter shifts position or if a lead breaks, there is time lost in diagnosing the cause of the problem. Although an EKG monitor can be attached directly to the catheter, whereby it can measure R-wave amplitude directly, EKG equipment is operated from line voltage. Therefore, an electrical hazard to the patient is introduced and this method should be avoided.

Consider the limitation wherein pacer operation is affected if a patient is subjected to electrical interference or noise. A noise level on a catheter implanted in a heart is not ordinarily discernible on an EKG, and the noise level may go undetected. In this situation, a demand pacer could provide stimulating pulses that "compete" with natural heartbeats.

My invention solves the problems and overcomes the limitations associated with these prior art methods of monitoring beating action of a patient's heart and heart stimulating action of a pacemaker. My monitor can safely be used on persons being transported to surgery. My invention gives an attending doctor or nurse a new and improved way to determine pacer function and catheter position. Also, in the event of a cardiac alarm, it provides a means for quicker observation of activity taking place between patient and pacer than was previously available. Additionally, my invention detects noise level interference, which can be compensated for by lowering the pacer sensitivity.

It is thus an object of my invention to provide a new and improved means for monitoring both natural heartbeating action and stimulated heartbeating action.

An additional object of my invention is to provide means for monitoring natural beating action of a subject's heart independently from monitoring pacer-stimulated beating action of the heart.

BRIEF DESCRIPTION

My invention relates to pacer and R-wave monitoring circuitry. More particularly, my invention relates to circuitry for use with a heart-stimulating pacer. The circuit monitors natural beating action of a patient's heart independently from monitoring stimulating action of a pacer. This is accomplished by separating pacer stimulation pulses from the patient's R-wave pulses at a point beyond the R-wave recognition circuitry of the pacer. One meter shows pacer activity, and the other shows patient R-wave activity. The input to the R-wave portion of the invention comes from the input to the timing circuitry of the pacer. The input to the pacer pulse portion of the invention comes from the output of the timing circuitry of the pacer.

In addition to supplying an input to the pacer pulse sensor, the pacer pulse circuitry also feeds a disable circuit. The disable circuit essentially disables the R-wave monitoring circuitry for a predetermined time. The purpose of this disabling circuitry, is to prevent the R-wave monitoring circuitry from providing an indication of natural heartbeat activity when a natural heartbeat did not really occur. An R-wave occurs if the heartbeat was natural or was stimulated.

The circuitry comprises transistor switches, sensitive microammeters, a timing circuit approximately a monostable multivibrator, and a DC power supply. Protective diodes are also employed.

DRAWINGS

DETAILED DESCRIPTION

Figure 1:
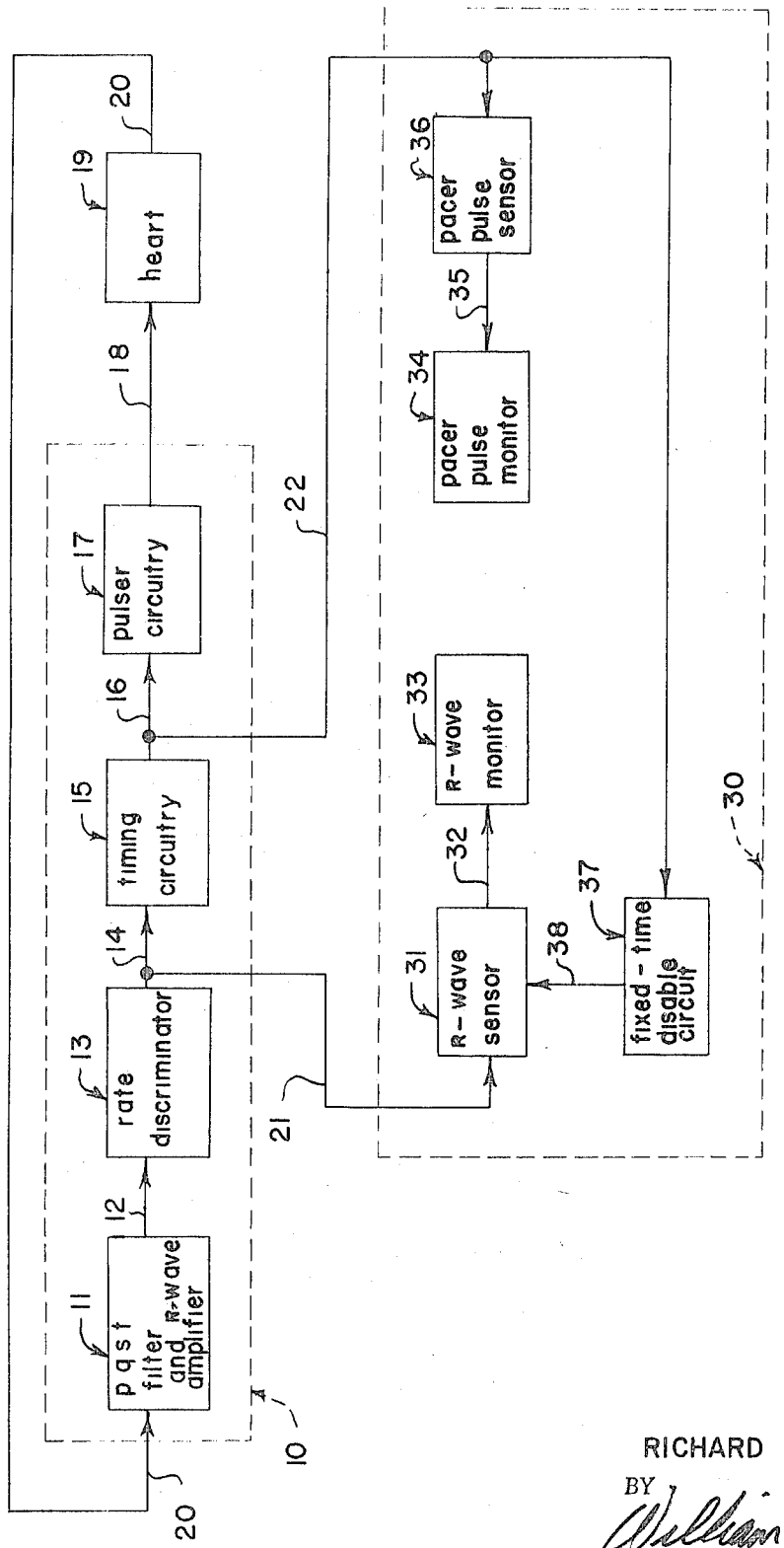
FIG. 1 is a schematic diagram of a first illustrative embodiment of my invention.

In FIG. 1 pacer 10 provides an output 18 to heart 19. Output 20 of heart 19 is fed back to pacer 10 at PQST filter 11. Output 12 of PQST filter 11 is fed to rate discriminator 13. Output 14 of rate discriminator 13 is fed to timing circuitry 15. Output 16 of timing circuitry 15 is fed to pulser circuitry 17. Output 18 of pulser circuitry 17 is fed to heart 19.

An additional output from rate discriminator 13 is the input on conductor 21 to my invention—pacer and R-wave monitor circuit 30. This input is fed to R-wave sensor 31. Output 32 of R-wave sensor 31 is fed to R-wave monitor 33 where it is displayed.

Rate discriminator 13 serves to prevent pacer 10 from operating in a "demand" mode in the presence of noise having frequency greater than 40 Hertz. For these noise signals, which appear to pacer 10 to be fast occurring heartbeats, rate discriminator 13 causes pacer 10 to operate in a free-running or fixed repetition rate mode.

An additional output from timing circuitry 15 is the input on conductor 22 to pacer pulse sensor 36 and also to fixed-time disable circuit 37. Output 35 of pacer pulse sensor 36 is fed to pacer pulse monitor 34 which displays the heart-stimulating action of pacer 10.

Heart output 20 usually occurs substantially uniformly in time. The output 20 is a result of either—(1) natural beating action of heart 19 or—(2) stimulated beating action of heart 19 due to a pacer stimulating pulse on input 18. In the former situation a pulse exists on conductor 21 and not on conductor 22. In the latter situation pulses exist on both conductor 21 and 22.

Natural beating action of heart 19 generates PQRST wave complex which is conducted to pacer 10. PQST filter 11 filters out all but the R-wave. The R-wave is processed in rate discriminator 13 and is used to discharge a timing capacitor in timing circuitry 15 before the timing capacitor charges to a predetermined threshold level. The processed R-wave pulse generates the pulse on conductor 21.

If the timing capacitor were not prevented from reaching the threshold, pulser circuitry 17 would discharge a larger capacitor through heart 19 in response thereto. This provides stimulation to the heart and a pulse output on conductor 22.

The timing circuitry of the pacer also feeds "fixed-time disable circuit" 37 whose output 38 feeds R-wave sensor 31. Input 38 to R-wave sensor 31 disables, or blanks out, the sensing apparatus of R-wave sensor 31 for a predetermined period of time designed to be approximately 200 milliseconds. This disabling prevents the R-wave monitor from displaying a false indication of natural heartbeat.

For example, when conductor 22 provides a pulse to sensor 36 and disable circuit 37, conductor 21 simultaneously provides a pulse to sensor 31. If disable circuit 37 were not incorporated, both R-wave monitor 33 and pacer pulse monitor 34 would register a heartbeat indication. R-wave monitor 33 would indicate a natural heartbeat, and pacer pulse monitor 34 would indicate a stimulated heartbeat. These two conflicting simultaneous indications do not occur because of the use of disable circuit 37.

Figure 2:
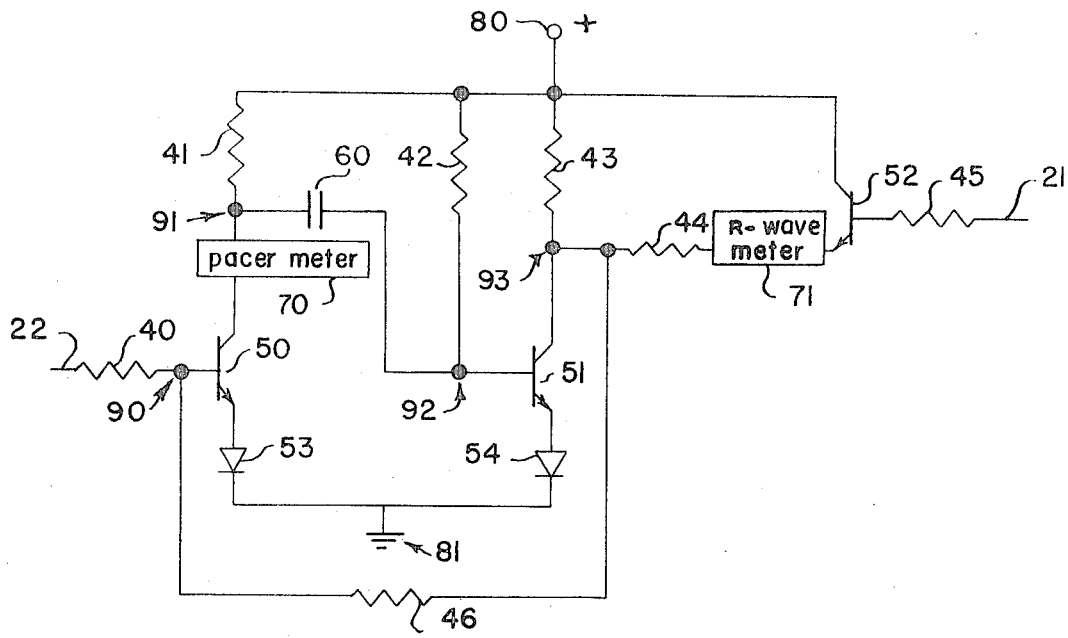
FIG. 2 is a circuit diagram of the preferred embodiment of my invention.

In FIG. 2, conductor 22 is connected to one end of resistor 40 the other end connected at junction 90 to the base of transistor 50 and to resistor 46. When a heart stimulating pulse is provided by the pacer, transistor 50 is turned on, since a related pulse appears on conductor 22 at that time. The collector of transistor 50 is connected in series with one end of meter 70 the other end being connected to junction 91. Junction 91 is connected to one end of resistor 41. The other end of resistor 41 is conducted to positive supply voltage terminal 80.

Diode 53 is connected between the emitter of transistor 50 and ground 81. It is oriented in that direction which provides easy current flow from the emitter of transistor 50 to ground 81. It is used for protection of the base-emitter junction of transistor 50, when large reverse voltages are developed between ground 81 and junction 90.

In operation, when transistor 50 turns on in response to detection of a pulse on its base, current flows from positive supply voltage terminal 80 through the series circuit comprising resistor 41, meter 70, transistor 50, and diode 53 to ground 81. Current flows for a time duration equal to the width of a current pulse into the base of transistor 50. Meter 70 thereby provides an indication which is visually monitored.

Junction 91 is also connected to one end of capacitor 60, the other end being connected to junction 92 at the base of transistor 51. The base of transistor 51 is also connected to one end of resistor 42 the other end connected to terminal 80. Transistor 51 is normally biased on by current flow from positive supply voltage terminal 80 through resistor 42 through the base-emitter junction of transistor 51. Current then flows from the emitter of transistor 51 to ground 81 via another protective diode 54. Accordingly, junction 93 is normally clamped to ground potential and does not normally hold transistor 50 on.

In operation, when transistor 50 turns on, the voltage at junction 91 is forced to be near ground potential. The voltage at junction 91 is due to a saturation voltage drop in transistor 50, and a forward biased diode voltage drop in diode 53. The voltage drop across meter 70 is negligible.

Prior to the switching of transistor 50, capacitor 60 is charged to a voltage approximately equal to the supply voltage at terminal 80. Junction 91 is at a potential equal to supply voltage 80 and junction 92 is near ground potential. When junction 91 is forced to ground potential, since capacitor 60 cannot change the voltage across itself instantaneously, junction 92 is forced to a voltage approximately equal to the supply voltage but negative with respect to ground 81. This large voltage between ground and junction 92 is supported by diode 54 protecting the base-emitter junction.

When transistor 51 has its base negatively biased it instantaneously stops conducting. Transistor 51 remains nonconducting for the time in which it takes capacitor 60 to discharge through the series circuit comprising meter 70, transistor 50, diode 53, ground 81, power supply (not shown) and resistor 42, back to the capacitor. This predetermined time is established by the values of capacitance and resistance of capacitor 60 and resistor 42.

For this predetermined time, junction 93 is a potential near that of supply voltage 80. For example, it is at a voltage equal to the supply voltage multiplied by the ratio of resistor 46 to the sum of resistors 46 and 43. The value chosen for resistor 46 is approximately 12 times that of resistor 43. Therefore the voltage at junction 93 is near twelve-thirteenths of the supply voltage 80.

Current flow from junction 93 through resistor 46 and the base-emitter junction of transistor 50 holds transistor 50 turned on for the predetermined time. Transistor 50 must be held on, so that junction 91 will remain near ground, forcing junction 92 to remain below ground by virtue of the voltage stored on capacitor 60. The predetermined time is longer than the time of the width of the pulse appearing on conductor 22.

Conductor 21 is connected to one end of resistor 45 the other end being connected to the base of transistor 52 which operates as a detector switch. The collector of transistor 52 is connected to positive supply voltage 80. The emitter of transistor 52 is connected to one end of meter 71 and the other end being connected to one end of resistor 44. The other end of resistor 44 is connected back to junction 93.

In operation, substantially simultaneously with the appearance of a pulse on conductor 22, a pulse appears on conductor 21 which is supposed to represent the natural beating action of heart 19. However, the pulse appearing on conductor 21 is caused by a stimulated heartbeat and not a natural one. In this particular situation, where the heart is beating in response to pacer stimulation, meter 71 should not register a natural heartbeat. This is accomplished by the high potential at junction 93. The voltage at junction 93 is higher in value than the voltage appearing at the base of transistor 52. This voltage condition reverse biases the base-emitter junction of transistor 52 and prevents current flow through meter 71.

On the other hand, when a naturally occurring heartbeat pulse appears on conductor 21, there is no corresponding simultaneous pulse on conductor 22. Transistor 51 remains turned on and does not turn off. The voltage at junction 93 is above ground by the sum of the voltage drops of the base-emitter junction of transistor 51 and the forward voltage drop of diode 54 which is approximately 1 volt. In this situation, the voltage on the base of transistor 52 is greater than the voltage at junction 93; current flows through meter 71 to cause a proper indication of natural heartbeat.

Recapitulating, junction 93 varies in voltage from approximately +1 volt, to approximately +26 volts and the value of voltage thereon determines whether or not meter 71 is disabled. The voltage on junction 93 is in turn a function of the existence or nonexistance of a pulse on conductor 22.

The preferred embodiment and best mode now known for the practice of my invention comprises the following component values:

TABLE I

| Resistors | 40 | 2 megohm |
|---|---|---|
| | 41 | 1 megohm |
| | 42 | 1.3 megohm |

| | | |
|---|---|---|
| | 43 | 1 megohm |
| | 44 | 10 kilohm |
| | 45 | 560 kilohm |
| | 46 | 12 megohm |
| Capacitor | 60 | 0.2 microfarad |
| Transistors | 50 | 2N4384 |
| | 51 | 2N4384 |
| | 52 | 2N5066 |
| Diodes | 53 | 1N198 |
| | 54 | 1N198 |
| Supply Voltage | | 28 volts DC |
| Meter 70 | | Mura Corp. Model — TEL10 |
| Meter 71 | | Mura Corp. Model — TEL10 |

Figure 3:
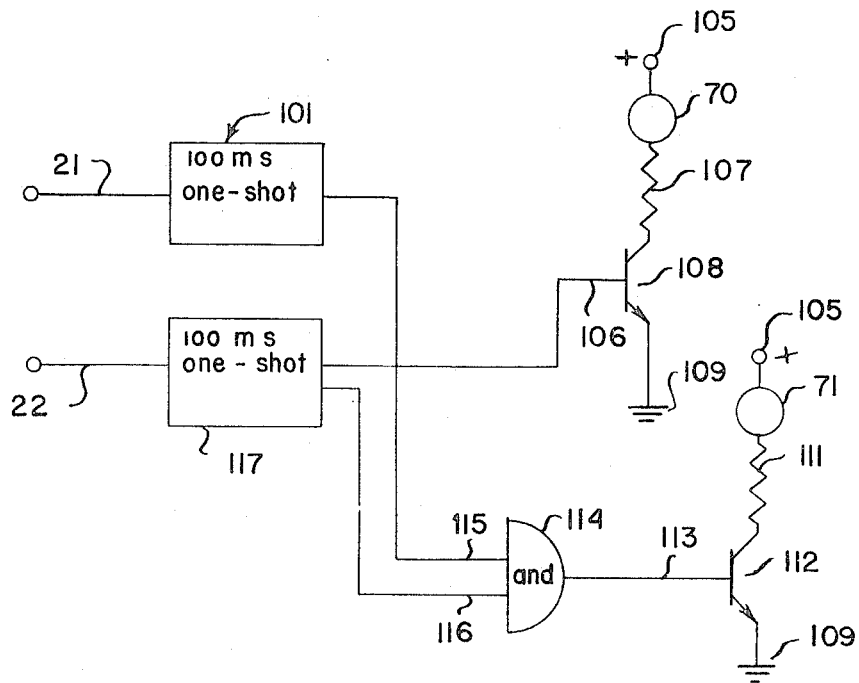
FIG. 3 is a circuit diagram of an alternative embodiment.

In FIG. 3, conductors 22 and 21 are connected from the pacer as before. Meters 70 and 71 are used to monitor stimulating action of the pacer and natural beating action of the heart respectively. Transistors 108 and 112 operate as switches in response to signals on their respective bases 106 and 113 providing current flow paths from positive supply voltage terminal 105 to ground.

Conductor 21 is connected to the input of one-shot multivibrator 101, the output of which goes to input 115 of AND-gate 114. Conductor 22 is connected to the input of one-shot multivibrator 117. The normally low voltage output of multivibrator 117 goes to base 106 of transistor 108 and the normally high output goes to input 116 of AND-gate 114. The output of AND-gate 114 is connected to base 113 of transistor 112.

In operation, consider a pulse appearing on conductor 22 in response to pacer stimulated heart action. Another pulse appears substantially simultaneously on conductor 21 in response to beating action of the heart. Both one-shot multivibrators 101 and 117 respond to these input trigger pulses and the input to transistor 108 on base 106 goes high. This causes current to be conducted from positive supply voltage terminal 105 through the series circuit comprising meter 70, resistor 107, and transistor 108 to ground 109.

Input 115 is simultaneously high. However, input 116 is simultaneously low. Therefore, AND-gate 114 is not enabled and transistor 112 is not turned on in response thereto. Therefore in this situation meter 71 properly provides no indication of natural heartbeat, and meter 70 provides an indication of stimulated action of the pacer.

On the other hand, consider the situation wherein a pulse on conductor 21 appears in response to a true natural beating of the subject's heart. No pulse simultaneously appears on conductor 22. One-shot multivibrator 101 again responds and input 115 to AND-gate 114 is high. Since there is no pulse appearing on conductor 22, one-shot multivibrator 117 maintains the input to transistor 108 low, and transistor 108 does not turn on. Input 116 to AND-gate 114 is high. AND-gate 114 is enabled due to simultaneous high inputs at inputs 115 and 116. The output of AND-gate 114 conducted to base 113 turns on transistor 112 allowing current flow through meter 71. Therefore, in this situation, meter 71 does provide an indication of natural heartbeating action, and meter 70 properly provides no indication of pacer stimulating action.

The one-shot multivibrators are designed to have a time constant of approximately 100 milliseconds to be compatible with a typical heartbeat rate of once every 800 milliseconds. Conceivably, the rate could double to once every 400 milliseconds, and the one-shot multivibrators would be compatible with this faster rate also. This circuit performs the same function as the circuit of FIG. 2. Natural heartbeating action and pacer stimulated heartbeating action are separately and independently monitored.

Furthermore, electrical meters have been used for monitoring means in the descriptions of both embodiments. It should be apparent to those skilled in the art that other monitoring devices such as digital counters can be used in conjunction with the meters to provide additional information.

From the two embodiments of my invention disclosed herein, it would be understood that other changes can be made in details, arrangements of components, and the components themselves, without departing from the spirit and scope of the invention as defined by the appended claims.

I claim:

1. A system for monitoring the natural heartbeats of a patient whose heartbeats are periodically pacer-stimulated comprising:
   first means for detecting each beating action of said patient's heart whether said beating action is natural or pacer-stimulated;
   second means for generating a signal indicative of said patient's heart having been pacer-stimulated prior to the beating thereof; and
   third means for indicating the occurrence of a natural heartbeat responsive to the operation of said detecting means only in the absence of the generation of said signal.

2. A system as recited in claim 1 wherein said second means includes additional means for detecting stimulating action of said pacer.

3. A system as recited in claim 1 wherein said first means comprises;
   a first electronic switch means arranged to be operated by natural beating action of said patient's heart; and
   a second electronic switch means arranged to be operated in response to said patient's heart having been pacer-stimulated prior to the beating thereof.

4. A system as recited in claim 1 wherein said second means comprises timing means responsive to said pacer-stimulated heartbeating action for providing a predetermined time wherein said signal is generated.

5. A system as recited in claim 1 wherein said third means is an electrical meter.

6. An electrical circuit arranged to monitor beating action of a subject's heart and stimulating action of a heart-stimulating pacer, said circuit comprising:
   first sensing means for sensing beating action of said subject's heart;
   first monitoring means normally responsive to said first sensing means for monitoring beating action of said subject's heart;
   second sensing means for sensing stimulating action of said pacer;
   second monitoring means responsive to said second sensing means for monitoring stimulating action of said pacer; and
   disabling means responsive to said second sensing means for disabling said first monitoring means for a predetermined time, whereby said first monitoring means is unresponsive to said subject's heart-beating action produced by stimulating action of said pacer within said predetermined time.

7. The electrical circuit of claim 6 wherein said first sensing means comprises a first electronic switch means arranged to control said first monitoring means, said first switch means arranged to transmit signals corresponding to beating action of said subject's heart.

8. The electrical circuit of claim 6 wherein said first monitoring means comprises a first electrical meter and a first resistance element in series connection with said first electrical meter.

9. The electrical circuit of claim 6 wherein said second sensing means comprises a second electronic switch means arranged to control, said second monitoring means, said second switch means arranged to transmit signals corresponding to stimulating action of said pacer.

10. The electrical circuit of claim 6 wherein said disabling means comprises:
    switching means responsive to stimulating action of said pacer for preventing said first monitoring means from incorrectly monitoring stimulating action of said pacer; and
    timing means responsive to stimulating action of said pacer for controlling said switching means for said predetermined time.

* * * * *